April 4, 1950 L. E. HAYSLETT 2,502,786
TELEMETERING OF COMPASS INDICATION
Filed Jan. 24, 1947 3 Sheets-Sheet 1
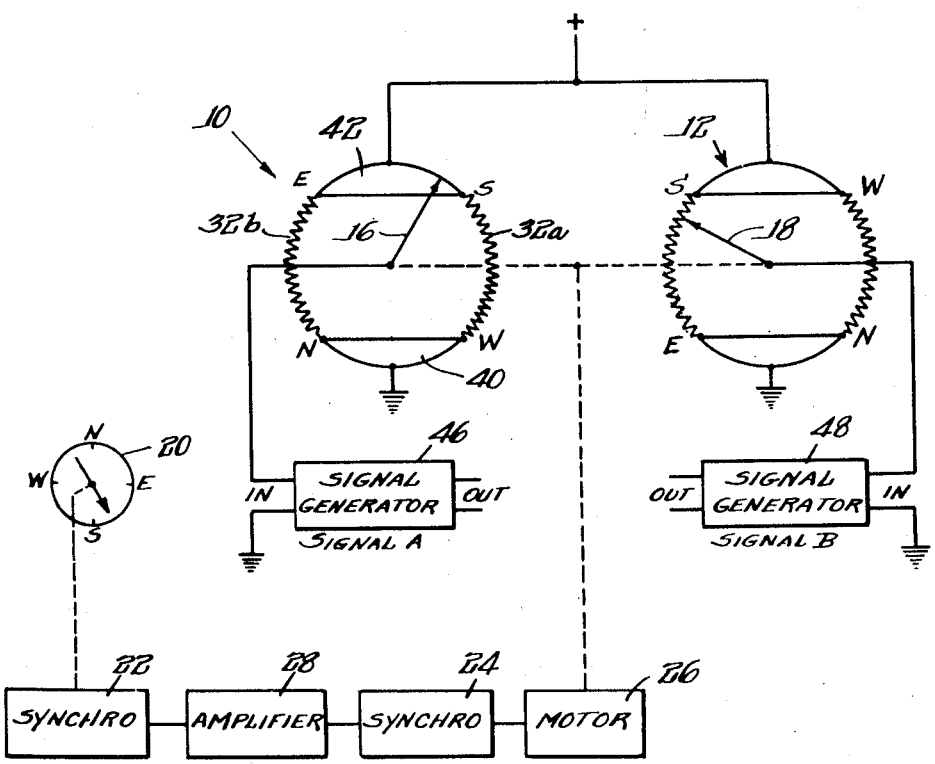
INVENTOR.
Lamar E. Hayslett April 4, 1950 L. E. HAYSLETT 2,502,786
TELEMETERING OF COMPASS INDICATION
Filed Jan. 24, 1947 3 Sheets-Sheet 2
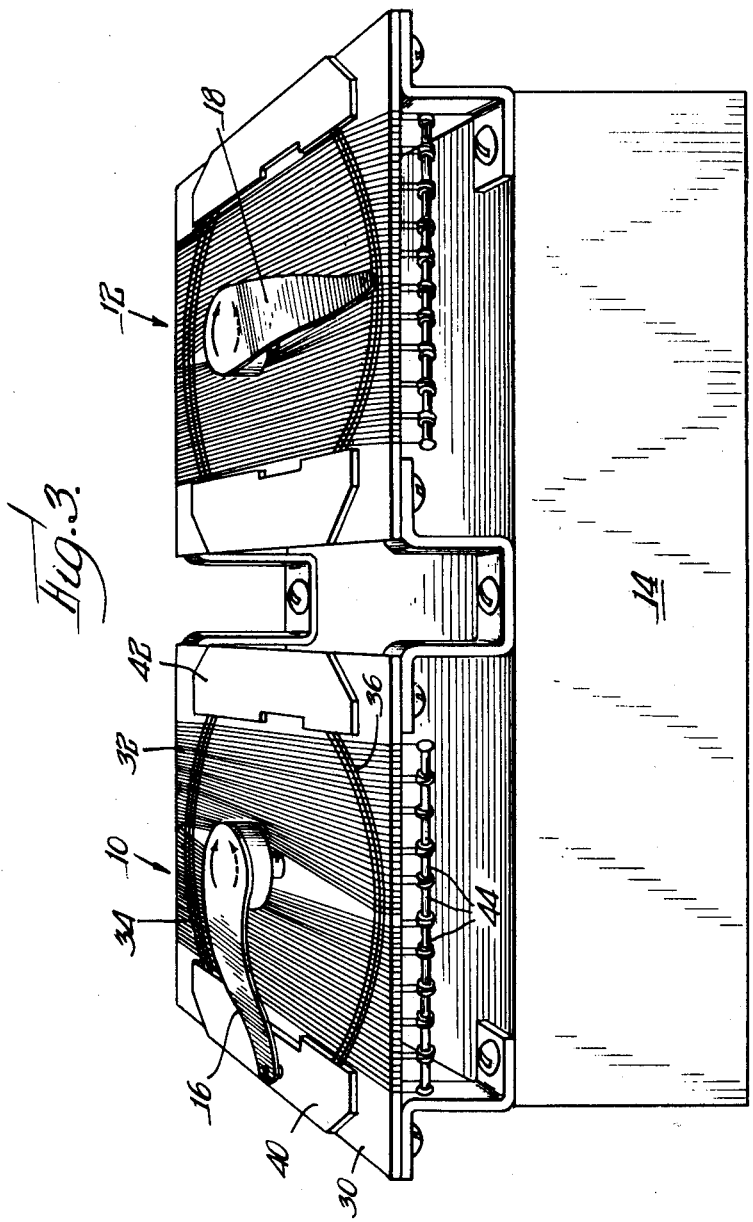
INVENTOR.
Lamar E. Hayslett
BY
Moore, Olson & Trexler
attys Patented Apr. 4, 1950

2,502,786

UNITED STATES PATENT OFFICE 2,502,786

TELEMETERING OF COMPASS INDICATION

Lamar E. Hayslett, Kenmore, N. Y., assignor to The Rudolph Wurlitzer Company, North Tonawanda, N. Y., a corporation of Ohio Application January 24, 1947, Serial No. 724,128

8 Claims. (Cl. 177—351)

This invention relates to telemetering systems, and particularly to such systems when used to reproduce the angular displacements of continuously rotatable indicator pointers such as compass needles.

A primary object of the present invention is to enable a pointer deflection of 360° or more to be transmitted as readily as an indication of less than 360°. This problem arises whenever an indicator having a pointer capable of continuous rotation in either direction is employed. A compass needle, for example, may rotate any number of times through its zero or north position in the course of operation of the instrument. In such instruments there is neither minimum nor maximum reading; hence the instrument indications cannot readily be represented by merely varying the strength of a single signal in accordance with the relative value of an indication, unless resort is had to rather elaborate means for carrying the receiving indicator pointer through what would otherwise be a region of discontinuity. The present invention obviates this difficulty by the use of a plural-signal code, each signal being continuously variable through successive minimum and maximum values, and the several signal variations constituting different functions of the indicator pointer position.

A further object of this invention is to provide an improved telemetering system wherein the instrument indication is transmitted by a pair of signals which vary in different ways when the value of the indication is changed. For each particular instrument reading there is a particular pair of signal values which is not repeated for any other reading. At the receiving end of the system an indicator is provided which is responsive to the paired signals for reproducing the indication of the transmitting instrument.

A still further object is to produce a pair of signals of the aforesaid character by means of a novel arrangement including two potentiometers similarly constructed and having rotatable contact arms which are maintained at a fixed relative angle.

Various other objects, features, and advantages of the invention will be apparent from the following specification when taken in connection with the accompanying drawings wherein a certain preferred embodiment is set forth for purposes of illustration.

In the drawings, wherein like reference numerals refer to like parts throughout:

Fig. 1 is a table which represents, in diagrammatic fashion, the paired signal values corresponding to certain compass readings in a system which embodies the principles of this invention;

Fig. 2 is a schematic diagram of the potentiometer circuits and certain associated parts of the transmitting equipment;

Fig. 3 is a perspective view of the potentiometers;

Figure 4:
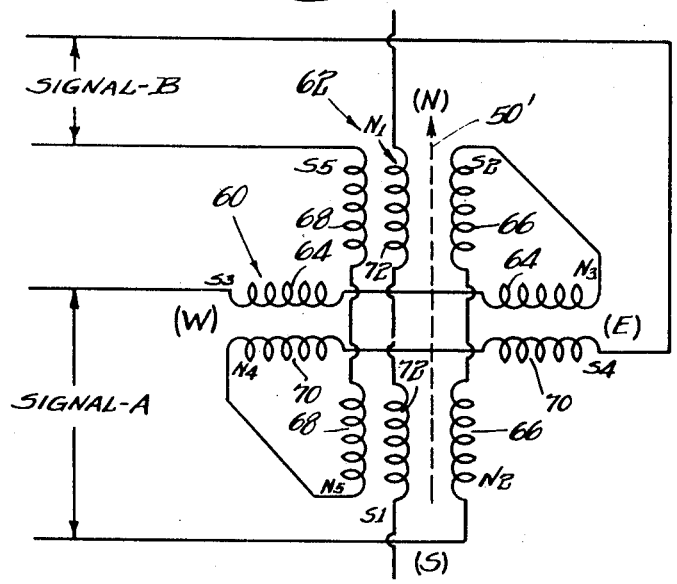
Fig. 4 is a wiring diagram of a receiving indicator.

The invention will be described herein with particular reference to a compass telemetering system such as may be employed to reproduce at a ground station the indications of an aircraft compass. Referring to Fig. 1, the telemetering transmitter in the aircraft sends out paired signals A and B which are distinguishable as by being transmitted on separate telemetering frequencies and which have variable magnitudes respectively represented by the relative lengths of the dashes in the table. Thus, the direction north (N) may be represented by two signals A and B each having a minimum energy value, east (E) by a signal A of maximum energy and a signal B of minimum energy, south (S) by signals A and B each of maximum energy, and west (W) by a signal A of minimum energy and a signal B of maximum energy. Compass readings intermediate these cardinal directions are represented by signals A and B which may vary individually between the minimum and maximum values thereof according to the angular position of the compass pointer. Thus, signal A varies between minimum and maximum values thereof in the north-east quadrant and south-west quadrant, but does not have any variation throughout the east-south quadrant or the west-north quadrant. Signal B has no variation throughout the north-east quadrant or the south-west quadrant, but varies between minimum and maximum values thereof in the east-south quadrant and the west-north quadrant. For any given compass direction, the signals A and B, respectively, will have two particular values, and this combination is not repeated for any other compass direction.

For controlling the relative strengths of the two compass signals in accordance with the table in Fig. 1, there are provided two potentiometers 10 and 12. Fig. 3, which are mounted on a drive housing 14. The contact arms 16 and 18 of the potentiometers are continuously rotatable and are mechanically coupled together in quadrature relationship, as shown in Figs. 2 and 3, the connection between the two arms being effected through the drive within the housing 14.

A servo system is provided to operatively connect the contact arms 16 and 18 to the rotary movement of the compass 20, Fig. 2, for rotation in unison therewith. Preferably two synchros 22 and 24 are employed to effect this operative interconnection. The synchro 22 may be of the type known commercially as a Magnesyn and is mounted on or coupled to the compass needle shaft. The synchro 24, preferably of the type designated by the trade name Autosyn, is coupled with a rapidly starting, low-inertia motor 26 which furnishes the driving torque for rotating the potentiometer contact arms 16 and 18. An electron tube amplifier 28 is interposed between the Magnesyn 22 and the Autosyn 24 to provide the necessary driving power to the Autosyn-motor combination without an appreciable reaction on the Magnesyn. The foregoing arrangement enables the compass needle to swing freely, while at the same time the double potentiometer contact arms 16 and 18 are caused to rotate in exact unison with the compass needle. Because of the 90-degree phase displacement between the contact arms 16 and 18, the arms engage corresponding points on the two potentiometers in sequence during the course of rotation of these arms.

The potentiometers 10 and 12, Fig. 3, are of substantially identical construction and hence it will be understood that a description of potentiometer 10 will apply equally well to potentiometer 12 except as specified otherwise herein. Several turns of resistance wire are wound around a flat insulating card or plate 30 to form a wire resistance element 32. The wire passes over arcuate bridges 34 and 36 which are notched for accurately positioning the wire turns. Metal contact plates or shoes 40 and 42 are placed on each side of the winding so that as the arm 16 rotates, its contact slides through an arc of 90 degrees on each of the shoes 40 and 42 and 90 degrees on each of the bridges 34 and 36. The shoes 40 and 42 are flush with the top of the winding on the bridges 44 and 46 to present a smooth surface for the sliding contact of the rotating arm 18.

The resistance wire of winding 32 is divided into a plurality of sections which are respectively shunted by balancing resistors 44 mounted on the frame of the potentiometer. The two ends of the winding 32 are connected respectively to the shoes 40 and 42. The potentiometer resistance can be adjusted to afford any desired resistance gradient by means of the resistors 44 for obtaining essential linearity or to introduce a correction factor compensating for lack of linearity in any part of the system.

Each of the potentiometers 10 and 12 controls the transmission of a signal A or B in the paired signal code set forth in Fig. 1. Thus, referring to Fig. 2, the potentiometer 10 may be so arranged as to feed an input signal of variable strength to a signal generator 46, the output of which is dependent on the input control signal. The potentiometer arm 18 is effective to vary the output of a signal generator 48. Signal generators 46 and 48 will be assumed to produce the signals A and B, respectively.

The winding 32 of potentiometer 10 may be considered as comprising two portions 32a and 32b which extend between and are connected to the shoes 40 and 42. A predetermined voltage is applied across the shoes 40 and 42 with shoes or plates 40 maintained at a given reference potential, conveniently ground. While the contact arm 16 is engaged with the shoe 40, the signal A will be of minimum strength. While the arm 16 is engaging the shoe 42 the signal A is of maximum strength. Intermediate these two positions, when the arm 16 is engaging the resistance element 32a or 32b, the signal strength A will vary between the maximum and minimum values thereof, according to the position of the arm 16. Therefore the junctions between the resistor 32b and shoe 40, between 32b and 42, between 42 and 32a, and between 32a and 40 correspond respectively to the compass directions north, east, south, and west, in accordance with the table in Fig. 1. The relation of the cardinal compass points to the various junction points on the potentiometer 12 are shifted by 90 degrees with respect to the corresponding relationships which exist in the case of the potentiometer 10, so as to conform with the variations of signal B in the table, Fig. 1.

Thus the conditions are fulfilled for producing dual signals to properly operate a receiving compass indicator which will be described presently. These two signals may be produced by any of several type of signal generators such as a constant audio frequency oscillator associated with one or more amplifier or "buffer" stages, the gain of which is controllable by varying the grid bias. It is apparent that if the grid bias is supplied by the potential picked off by either of the arms, 16 or 18, the amplitude of the output of the signal generator will vary with the magnitude of the direct current input while the frequency remains constant. Other signal generators such as produce a constant amplitude and variable frequency or a variable pulse length could of course be adapted for use with this invention. The two signals so produced are used to modulate a radio-frequency carrier, which is in turn picked up and demodulated at a receiving station. The radio link between the telemetering transmitter and receiver is preferably of a well known type in which a plurality of different modulating frequencies are impressed on a single carrier in a radio transmitter and separated in a radio receiver by means of tuned circuits or bandpass filters, but it is apparent that two transmitters having different carrier frequencies each of which is modulated by one of the signal generators could be used, and any suitable radio receiver could be used to detect the signals. In fact, in many applications a direct connection could be made between the signal generators and the receiving indicator and in such applications it would only be necessary to rectify the signal. The receiving compass indicator for translating received data signals to compass readings is shown in Figs. 4 and 5.

Figure 5:
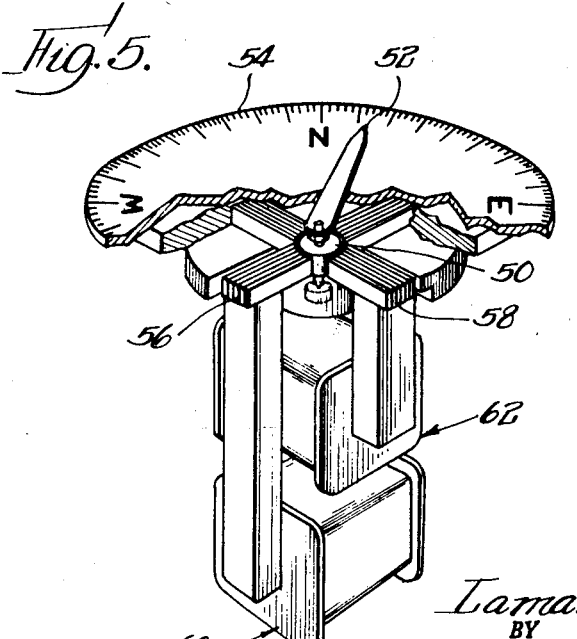
Fig. 5 is a perspective view, with certain parts shown broken away, of the receiving indicator.

Referring to Fig. 5, the receiving indicator has a magnetically polarized rotatable element such as a steel disc 50 which is mounted on a shaft that rotates in jewelled bearings. One end of the shaft carries a pointer 52 which rotates over a compass card 54. The steel disc 50 is magnetized along a diameter thereof and turns in a field which is set up between two pairs of poles 56 and 58 which are in the magnetic circuits of field coils 60 and 62, respectively. The field coils 60 and 62 and pole pieces 56 and 58 are so arranged that their magnetic axes are mutually perpendicular with respect to each other, causing the two fields to cross at right angles between the pole pieces. A resultant field is set up, the angular position of which is dependent upon the relative magnitudes of the received signals A and B.

The field coils 60 and 62 have composite windings, the coil 60 consisting of two windings and the coil 62 having three windings thereon. These windings are illustrated diagrammatically in Fig. 4, where it will be noted that the five windings are interconnected to form three groups. The first group, composed of windings 64 and 66 connected in series, is adapted to be energized by signal A and is arranged so that the windings 64 and 66 are respectively included in the field coils 60 and 62 to provide mutually perpendicular magnetic fields as determined by the signal A. The second group, composed of windings 68 and 70 connected in series, is adapted to be energized by signal B, the windings 68 and 70 being respectively included in the field coils 62 and 60. A third winding 72 is included in the field coil 62 and constitutes the third group, the winding 72 being energized from a local stabilized voltage source. The stabilized voltage source may be of any well known D. C. type such as a glow tube and has its output connected directly across the extremities of the windings 72 so as to magnetically polarize them in opposition to the windings 66 and 68 when the latter are energized. The stabilized voltage should be of such value that the magnetic force of the windings 72 exactly balances that of either of the windings 66, 68 when energized by a maximum signal. The dashed arrow 50', Fig. 4, between coils 66 and 72 represents the magnetized disc 50, Fig. 5, with the arrow point indicating the north-seeking pole. This arrow 50' may also be considered as representing the receiving indicator pointer 52 rotating over the compass card 54 carrying designations N, E, S, and W.

The magnetic polarity of the winding 72 is indicated by the letters $N_1$ and $S_1$ in Fig. 4. The polarities of the windings 64 and 66, when a signal A is being received, are indicated by the letters $N_3S_3$ and $N_2S_2$, respectively. The magnetic polarities of windings 68 and 70, when a signal B is being received, are designated by the letters $N_5S_5$ and $N_4S_4$, respectively. Thus, it will be seen that the windings 66 and 68 aid each other in establishing a magnetic field, and that these windings are opposed by the winding 72. The windings 64 and 70 in field coil 60 oppose each other in establishing a magnetic field perpendicular to that set up by field coil 62.

Operation of the receiving indicator will be described with reference to Fig. 1, Fig. 2 and Fig. 4. When the compass at the transmitting station is indicating N, the signals A and B, due to the contact arms 16 and 18 contacting the plates 40, both are at minimum value, which may be zero, so that the magnetic field produced by windings 66 and 68 is insignificant by comparison with the magnetic field $N_1S_1$ produced by winding 72. The magnetic fields $N_3S_3$ and $N_4S_4$ cancel out. This causes the indicator pointer 52, Fig. 5, to be positioned at N on the compass card 54. On the other hand, if the transmitting compass indicator stands on S, both the contact arms 16 and 18 are on the plates 42, the signals A and B are both at maximum value, and the sum of the magnetic fields $N_2S_2$ and $N_5S_5$ is substantially greater than the magnetic field $N_1S_1$, causing the receiving indicator pointer to assume the position S. The fields $N_3S_3$ and $N_4S_4$ again cancel each other.

When the transmitting compass needle indicates E, the contact arm 16 is on the plate 42 of the potentiometer 10 and the contact arm 18 is on the plate 40 of the potentiometer 12 so that the magnetic polarity of the field set up by the coil 60 is that of the field $N_3S_3$, the field $N_4S_4$ being relatively weak under these conditions. For a transmitting compass indication of W, the reverse is true, the field $N_4S_4$ predominating over the field $N_3S_3$. The receiving indicator pointer assumes the position E or W, respectively, under the foregoing circumstances. The windings 66, 68 and 72 are so related that the flow of maximum current through either of the windings 66 and 68 while minimum current is flowing in the other of these windings causes cancellation of the field $N_1S_1$.

As may be readily seen in Fig. 2, each plate 40, 42 and each winding $32a$, $32b$ occupies a sector of 90° and the contact arms 16, 18 are displaced by 90°. Consequently, one or the other of the arms 16, 18 is at all times contacting one or the other of the plates 40, 42 so that one signal is constant while the other is varying while the contact arms rotate over the alternate sectors constituting the plates and resistance elements of the potentiometer. For instance, as the compass indication at the transmitter changes from (W) to (N), signal A remains constant at a minimum while signal B decreases from maximum to minimum causing resultant rotation of the field in the receiving indicator toward (N) because flux $N_4S_4$ and $S_5N_5$ are both reducing until finally only the polarizing flux $N_1S_1$ remains.

For any compass indication, whether a cardinal compass direction or an intermediate indication, the resultant magnetic field set up by the field coils 60 and 62 will always so orient itself as to correspond exactly with the angular position of the transmitting compass needle. When the angular position of the compass needle is continually changing, the resultant magnetic field at the receiving end accurately follows the needle movement. There is no region of discontinuity anywhere in the course of rotation of the indicator pointer. The apparatus at both the transmitting and receiving ends is very simple in construction, easy to maintain in service and inexpensive to manufacture. It will be understood of course that the system can readily be adapted to uses other than the telemetering of compass indications, being employed to advantage wherever the reading of a continuously rotatable indicator is to be transmitted.

It is obvious that various changes may be made in the specific embodiment set forth for purposes of illustration without departing from the spirit of the invention. The invention is accordingly not to be limited to the specific embodiment shown and described, but only as indicated in the following claims.

The invention is hereby claimed as follows:

1. In a radio telemetering system, a potentiometer comprising two spaced conducting plates, means affording two diametrically opposed arcuate resistance paths between said plates and angularly equal in extent with said plates, and a continuously rotatable contact arm arranged to engage said plates and said resistance paths respectively throughout successive sectors of its rotary movement, means for establishing a predetermined difference of potential between said plates, and means responsive to the variable potential difference between said contact arm and a given reference potential for furnishing a signal according to such variable potential difference whereby a constant signal is furnished while the arm contacts a plate and a variable signal is furnished while the arm contacts a resistance path.

2. In a telemetering system for transmitting data by multiple-signal combinations from an indicator having a continuously rotatable movement, a plurality of signal generators, and a plurality of rotary circuit elements respectively controlling the outputs of said signal generators as different functions of the angular position of said movement, each of said elements having alternate resistive components and components of negligible resistance, said latter components maintained at fixed potentials, and a continuously rotatable function-performing member operatively connected to said movement for rotation in unison therewith, the members so phased that one contacts a resistive component while the other contacts a component of negligible resistance whereby one signal generator sends a constant signal while the other varies.

3. In a telemetering system including an indicator having a continuously rotatable movement, and a plurality of signal generators each of which furnishes a signal, the combination of said signals representing the various angular positions of said movement, a plurality of control devices for causing the respective outputs of said signal generators to vary as dissimilar functions of the variation in angular position of said movement, each such control device comprising a continuously rotatable contact arm operatively connected to said indicator movement for rotation in unison therewith, and conductive circuit components cooperating with said contact arm and arranged to effect execution of a continuous function through successive minimum and maximum values thereof as said arm is rotated, said circuit components cooperating with each arm including alternate components of high and of negligible resistance, said latter components being equal in extent and the components of negligible resistance being maintained at constant potentials, the several control devices being so related that any given increment in angular position of the indicator movement produces different increments of the several functions thereof.

4. A plurality of control devices as set forth in claim 3, the several control devices being substantially identical and the contact arms thereof being displaced in phase.

5. In a telemetering system including an indicator having a continuously rotatable movement, and a plurality of signal generators, means for relating the respective outputs of said signal generators as dependent variables to the indicator reading as a common independent variable, such means comprising a pair of potentiometers each having a continuously rotatable contact arm, each of said potentiometers also including two spaced plates adapted to be contacted by said arm throughout two diametrically opposite sectors of the rotary motion of said arm, and resistance means adapted to be contacted by said arm throughout the intervening sectors of the rotary motion thereof, the various sectors being equal in extent, said contact arms having fixed angular positions relative to each other, and means operatively connecting said contact arms to the indicator movement for rotation therewith, said potentiometers being of substantially identical construction and being so arranged that one of the contact arms contacts a plate while the other contacts a resistance element.

6. In a radio telemetering system, an indicator having a continuously rotatable pointer, a pair of signal generators, a pair of rotary potentiometers respectively controlling the output of said signal generators, each of said potentiometers including a continuously rotatable contact arm having only one sliding contact thereon, a pair of spaced contact plates maintained at constant potential and each occupying a quadrant of said potentiometer and adapted to be engaged by said arm throughout diametrically opposite quadrants of the rotary motion of said arm, and a wire-wound resistance element disposed between and electrically connected to said plates for contacting said arm throughout the intervening quadrants of the rotary motion thereof, and means operatively connecting said contact arms to the indicator movement for conjoint rotation therewith, said contact arms being angularly displaced in quadrature relationship as to each other with respect to corresponding points on said potentiometers so that one signal generator sends out a constant signal while the other varies.

7. In a radio telemetering system, a pair of potentiometers each comprising two spaced conducting plates, diametrically opposed, arcuate resistance paths between said plates and equal in extent therewith, and a rotatable contact arm to engage said plates and said resistance paths respectively throughout successive sectors of its rotary movement, the contact arm associated with each potentiometer being mechanically coupled to the other contact arm with a fixed predetermined angle there between and electromechanically coupled to an indicator, means for establishing a predetermined difference of potential between said plates, and means responsive to the variable potential difference between each contact arm and a given reference potential for furnishing a signal according to such variable potential differences.

8. In a radio telemetering system, a potentiometer comprising a plurality of spaced conducting plates, a plurality of resistance elements disposed between said plates, and a continuously rotatable contact arm arranged to contact said plates respectively throughout a plurality of circumferentially spaced sectors of its rotary movement and to contact said resistance element in the intervening sectors of such rotary movement, means for applying different potentials to said plates, and means responsive to the variable potential difference between said contact arm and a given reference potential for furnishing a signal according to such variable potential difference, the potential applied to one plate being positive, and the other plate being at ground potential.

LAMAR E. HAYSLETT.

REFERENCES CITED

The following references are of record in the file of this patent:

UNITED STATES PATENTS

| Number | Name | Date |
|---|---|---|
| 1,610,546 | Brandecker | Dec. 14, 1926 |
| 1,626,560 | Schneider | Apr. 26, 1927 |
| 2,197,636 | Faus | Apr. 16, 1940 |
| 2,256,482 | Isbister | Sept. 23, 1941 |
| 2,285,969 | Hempel | June 9, 1942 |
| 2,330,588 | Jewell | Sept. 28, 1943 |
| 2,342,947 | Lingel | Feb. 29, 1944 |
| 2,396,244 | Borsum | Mar. 12, 1946 |

FOREIGN PATENTS

| Number | Country | Date |
|---|---|---|
| 694,427 | Germany | Aug. 1, 1940 |